3,398,158
1-PHENYL-4-ALKYLAMINO-PYRAZOLES
Raffaello Fusco, Milan, and Mario Bianchi, Carate, Brianza, Italy, assignors, by mesne assignments, to Warner-Lambert Pharmaceutical Company, Morris Plains, N.J., a corporation of Delaware
No Drawing. Filed Feb. 16, 1965, Ser. No. 433,175
Claims priority, application Italy, Feb. 19, 1964, 3,661/64
8 Claims. (Cl. 260—310)

ABSTRACT OF THE DISCLOSURE

There have been prepared new pyrazole derivatives represented by the following formula:

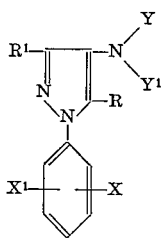

where R is hydrogen, methyl or hydroxymethyl, $R^1$ is hydrogen or methyl, X represents hydrogen, lower alkyl, hydroxy, lower alkoxy, halogen, amino, lower alkylamino, lower dialkylamino, acetylamino or nitro, $X^1$ is hydrogen or lower alkyl, Y is hydrogen, lower alkyl or the group $CH_2SO_3M$, where M is an alkali metal and $Y^1$ is lower alkyl or cycloalkyl.

The invention also includes within its scope non-toxic pharmaceutically acceptable acid addition salts of the compounds represented by the formula.

The compounds of the invention are useful as antipyretic, analgesic and antiinflammatory agents. They may be administered orally or enterally in admixture with a pharmaceutically acceptable carrier. They may be presented as tablets, capsules or suppositories in dosage unit form containing from about 5 mg. to about 500 mg. of the active ingredient.

---

This invention relates to new 1 - phenyl - 4 - alkylamino-pyrazoles, to a process for their preparation and to pharmaceutical compositions containing them as active ingredients.

It is known that aminopyrine and many other pyrazolone derivatives have been found in the past of particular interest for their antipyretic and analgesic properties. The feature common to all the active compounds is the presence of a keto function at the 5 - position of the pyrazole ring.

We have now found that the pyrazolone structure is not essential for producing active compounds. According to the present invention new pyrazole derivatives are obtained without the keto function at the 5-position which possess useful antipyretic and analgesic activity.

The new compounds of this invention may be represented by the following formula:

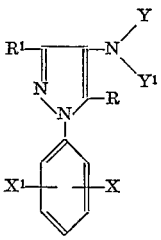

where R is hydrogen, methyl or hydroxymethyl, $R^1$ is hydrogen or methyl, X represents hydrogen, lower alkyl, hydroxy, lower alkoxy, halogen amino, lower alkylamino, lower dialkylamino, acetylamino or nitro, $X^1$ is hydrogen or lower alkyl, Y is hydrogen, lower alkyl or the group $CH_2SO_3M$, where M is an alkali metal, particularly sodium, potassium or calcium and $Y^1$ is lower alkyl or cycloalkyl.

The invention also includes within its scope non-toxic pharmaceutically acceptable acid addition salts of said 4 - alkylamino - pyrazoles.

The term lower alkyl, as used herein, means a saturated hydrocarbon radical containing from one to seven carbon atoms, such as methyl, ethyl, propyl, butyl, amyl, hexyl, heptyl, and their isomers or an unsaturated hydrocarbon radical such as allyl. In the compounds of this invention, the preferred lower alkyl groups are methyl and ethyl.

The term cycloalkyl stands for a cycloaliphatic hydrocarbon radical containing from four to seven carbon atoms and the lower alkoxy group is an ether group containing a lower alkyl of the same type described above.

The substituents of the phenyl ring may be attached to any of the positions available for substitution. However, when one substituent is present it preferably occupies the ortho or para position to the bond phenyl/pyrazole. When two substituents are present, they preferably are both methyl and occupy the ortho and ortho' position to the bond phenyl/pyrazole.

Advantageous compounds of this invention are those of Formula I wherein X and $X^1$ are hydrogen and preferred compounds are 1 - phenyl - 4 - methylamino-pyrazole, an alkali metal salt of 1 - phenyl - pyrazole - 4-methylamino methanesulphonate, 1 - phenyl - 4 - dimethylamino - pyrazole, 1 - phenyl - 5 - methyl - 4-dimethylamino - pyrazole, 1 - phenyl - 3,5 - dimethyl - 4-dimethylamino - pyrazole and 1 - phenyl - 5 - hydroxymethyl - 4 - dimethylamino - pyrazole. The 1 - phenyl-4 - alkylamino - pyrazoles of this invention and their pharmaceutically acceptable acid addition salts are useful as antipyretic, analgesic and antiinflammatory agents.

In addition, the compounds of formula I in which Y represents a group $CH_2SO_3M$ are also useful for stabilizing the corresponding 4 - monoalkylamino - pyrazoles.

The compounds of this invention are prepared by alkylation of the appropriate 4 - amino - pyrazoles. The term alkylation includes any method suitable to introduce one or two alkyl radicals in the amino group in the 4-position of the pyrazole ring. Alkylation may take place in one step to give, even through new intermediates that may be isolated, dialkylamino derivatives in which the alkyl radicals are identical to each other. Otherwise, alkylation may be carried out so as to obtain first a monoalkyl-amino derivative, that may be isolated or submitted to further alkylation to obtain the corresponding dialkylamino compound. This latter procedures is advisable to obtain dialkylamino derivatives in which the alkyl radicals are different from each other.

The one step alkylation for the preparation of N-dialkyl derivatives may be advantageously effected by treating the starting amine with a lower alkyl halide or a lower dialkyl sulphate. Examples of these alkylating agents are methyl bromide or chloride, ethyl, propyl, butyl bromide or chloride, dimethyl sulphate, diethyl sulphate and the like. As an intermediate of the reaction, there is obtained a quaternary salt or the corresponding quaternary base that may be easily decomposed by treatment with an alkali or by pyrolysis.

When two methyl groups are to be introduced, methylation may be carried out with any of the methylating agents known in the art. Thus, for example, in addition to treatment with a methyl halide or dimethylsulphate, methylation may be attained by reacting the starting amine with formaldehyde or with a formic acid-formaldehyde mixture, catalytically hydrogenating under appropriate conditions.

For the preparation of monoalkylamino derivatives, a suitable procedure consists of treating the appropriate 4-aminopyrazole with p-toluene-sulphonylchloride, in alkylating the intermediate p-toluene-sulphonamido derivative with one of the alkylating agents above mentioned and then isolating the monoalkylamino derivative by acid hydrolysis.

An alternate procedure for monoalkylation consists in subjecting the starting amine to a reductive alkylation, that is by treating the amine with an aliphatic or cycloaliphatic aldehyde or ketone and catalytically hydrogenating under appropriate conditions, using for example Raney nickel as catalyst.

The resulting monoalkylamino derivative may be converted, if desired, into the corresponding dialkylamino compound by further alkylation, according to any of the alkylating methods mentioned above.

Since alkylation is generally carried out under drastic conditions, it is advisable to first protect any hydroxy or amino group which may be present in the molecule of the starting 1-phenyl-4-aminopyrazole, when it is desired to recover these groups in the corresponding 1-phenyl-4-alkylamino-pyrazole. For this purpose, the amino group may be protected by the formation of an acetylamino derivative, while the hydroxy group may be converted, for instance, into the corresponding benzyl ether or benzoate ester. The alkylation being performed, the free functions may be easily restored according to conventional methods; for example the amino group is reformed by saponification of the acetylamino group while the hydroxy group may be restored by reductive debenzylation of the benzyl ether or by hydrolysis of the corresponding benzoate.

If the hydroxy or amino groups are not previously protected they are converted during the alkylation to the corresponding alkoxy or alkylamino groups.

The 4-mono or dialkylamino-pyrazoles of this invention may be converted, according to known methods, into the corresponding acid addition salt by treatment with a mineral or organic pharmaceutically acceptable acid. Particularly preferred acid addition salts are those with hydochloric, hydrobromic, phosphoric, citric, tartaric, ascorbic, dichloroacetic and cyclohexylsulphamic acids, but any other pharmaceutically acceptable acid addition salt may be prepared.

The 4-monoalkylamino derivatives may also be converted, according to the present invention, to the corresponding N-methanesulphonates, by treatment with formaldehyde in the presence of an alkaline bisulphite. The reaction is carried out according to known techniques, that is by adding the monoalkyl compound to a solution of an alkali metal bisulphite in the presence of an aqueous solution of formaldehyde and then isolating the resulting 4-aminopyrazole N-alkyl N-methanesulphonate.

The new compounds of this invention may be used in the form of pharmaceutical preparations which contain the new compounds or the salts thereof in admixture with a pharmaceutical, organic or inorganic, solid or liquid carrier suitable for oral or enteral administration. Thus the compounds of the invention may be administered in the form of tablets, capsules or suppositories in dosage unit forms. The preferred concentration of the compounds in these dosage unit compositions is from about 5 mg. to about 500 mg. and preferably, from 10 to 250 mg.

The following examples illustrate the invention.

Example 1

To a solution of 1.6 g. of 1-phenyl-4-aminopyrazole in 75 cc. of absolute ethyl alcohol, are added 2.4 cc. of an alcoholic solution containing 30% by weight of formaldehyde and 0.15 g. of Raney nickel catalyst. The mixture is subjected to a stream of hydrogen under pressure while being maintained at room temperature. When the hydrogen absorption is completed, the mixture is filtered and evaporated under vacuum. The residue distilled gives 1.5 g. of 1-phenyl-4-dimethylamino-pyrazole; B.P. 100° C./ 0.1 mm. Hg. This product solidifies at room temperature and melts at 45–47° C. Through a solution of 1 g. of said product in 50 cc. of ether, there is bubbled gaseous, dry hydrochloric acid for about 30 minutes to obtain the corresponding hydrochloride; M.P. 172–174° C.

Example 2

A mixture of 47.75 g. of 1-phenyl-4-aminopyrazole, 151.3 g. of dimethylsulphate and 70 g. of anhydrous sodium carbonate in 470 cc. of methyl alcohol, is heated under reflux with stirring for 7–8 hours. Then it is concentrated under vacuum and the residue taken up with 500 cc. of water. The mixture is treated with 200 g. of sodium hydroxide, heated under reflux for two hours and then diluted with water. After extraction with ether, drying and evaporation of the ethereal extracts 37 g. of 1-phenyl-4-dimethylamino-pyrazole are obtained; M.P. 44–46° C.

Example 3

A mixture of 19 g. of 1-phenyl-4-aminopyrazole, 228 g. of methyl bromide and 33.2 g. of potassium carbonate in methanol, is kept for 60 hours at room temperature, then it is filtered on a warm filter and the filtrate is evaporated. The residue, consisting of the quaternary salt 1-phenyl-4-(trimethylamino bromide)pyrazole, is washed with methyl ethyl ketone and heated at 220–225° C. The product obtained by pyrolysis is taken up with ether, filtered and the solvent is evaporated. The oily residue is distilled to give 14.8 g. of phenyl-4-dimethylamino-pyrazole, identical with the product prepared as described in Example 2.

Likewise, by employing allyl bromide as alkylating agent there is obtained 1-phenyl-4-bis-allylamino-pyrazole, as an oily product, which is purified by chromatography and converted to the hydrochloride salt; M.P. 116–118° C.

Example 4

1-phenyl-4-amino-pyrazole is treated with dimethyl sulphate or methyl chloride as described in Examples 2 and 3. The reaction product is dissolved in water and treated with an alcoholic solution of picric acid. The quaternary picric salt which forms, is dissolved in an acetone-water mixture and passed through an ion exchange column containing a basic exchange resin. By elution with an acetone-water mixture, evaporation of the eluate and distillation at 22 mm. Hg, 1-phenyl-4-dimethylamino-pyrazole is obtained (yield 79%).

The same product is obtained by dissolving in water the quaternary halide obtained as in Example 3, treating the solution with silver oxide, stirring for about 30 minutes at room temperature, filtering and separating the 1-phenyl-4-dimethylamino-pyrazole from the filtrate.

By following the procedure described above or the methods described in Examples 1, 2 and 3, 1-phenyl-3-methyl-4-dimethylamino-pyrazole, B.P. 75°/0.1 mm. Hg and 1-phenyl-5-methyl-4-dimethyl-amino-pyrazole, B.P. 98–103° C./0.5 mm. Hg are obtained. Their hydrochlorides melt at 178–180° C. and 193–195° C. respectively.

Example 5

2 g. of 1-phenyl-3,5-dimethyl-4-amino-pyrazole, 1 g. of 98% formic acid and 2 cc. of formalin are heated on water-bath for 2 hours. The mixture is diluted with water, alkalized with sodium hydroxide and extracted with ether. The ethereal extract, after being dried on sodium sulphate and evaporated, gives an oil from which, after distillation, 1.7 g. of 1-phenyl-3,5-dimethyl-4-dimethylamino-pyrazole, B.P. 107° C./0.1 mm. Hg are obtained. The product solidifies at room temperature and melts at 40–41° C. The corresponding hydrochloride, prepared by bubbling gaseous, dry hydrochloric acid through the ethereal solution of the base, is a hygroscopic product melting at 183–185° C.

Example 6

To a solution of 4.8 g. of 1-phenyl-4-amino-pyrazole in 50 cc. of methanol are added 7 g. of anhydrous sodium carbonate and 10.2 g. of diethylsulphate. The mixture is heated under stirring for 6 hours, then treated as described in Example 3 to give 4.5 g. of 1-phenyl-4-diethyl-amino-pyrazole; B.P. 124–125° C./0.1 mm. Hg. By treating the base in anhydrous ether with alcoholic hydrochloric acid, 5.15 g. of hydrochloride are obtained, M.P. 148–150° C. The same product is obtained by treating the starting amine with ethyl iodide, as described in Example 3.

Example 7

6.4 g. of 1-phenyl-4-amino-pyrazole are dissolved in 20 cc. of anhydrous pyridine and to the solution are added 8.4 g. of p-toluene-sulphonyl chloride. The mixture is left to stand overnight, then diluted with water, acidified with dilute hydrochloric acid, filtered and crystallized from dilute ethyl alcohol. 11.4 g. of 1-phenyl-4-(p-toluene-sulphonamido)-pyrazole are obtained, M.P. 180–182° C.

To a solution of 4.7 g. of this product in a 10% aqueous sodium hydroxide, are added 1.9 g. of dimethyl sulphate. The mixture is kept at boiling for 3–4 hours, then extracted with ether and the ethereal extract is washed first with dilute sodium hydroxide, then with water. After evaporation, 3.3 g. of 1-phenyl-4-(methyl-p-tosyl)amino-pyrazole are obtained, M.P. 81–83° C. 10.8 g. of the product so obtained are suspended in 86 cc. of dilute sulphuric acid and heated under reflux for 15 minutes about. The mixture is diluted with water, alkalized with sodium hydroxide and extracted with ether. By evaporation of the ether and distillation of the residue, 4.4 g. of crude 1-phenyl-4-methyl-amino-pyrazole are obtained. The corresponding hydrochloride, purified by crystallization from alcohol-ether, melts at 178–180° C.

Example 8

By following the procedure described in Example 7, starting from 9.4 g. of 1-phenyl-4-(p-toluenesulphonamido)-pyrazole and alkylating with diethyl sulphate, 8.1 g. of 1-phenyl-4-(ethyl-p-tosyl)-amino-pyrazole are obtained, M.P. 137–139° C. which treated with sulphuric acid give 1-phenyl-4-ethylamino-pyrazole, B.P. 125–127° C./0.1 mm. Hg. The corresponding pure hydrochloride melts at 223–225° C.

Example 9

To a solution of 12.8 g. of 1-phenyl-4-amino-pyrazole in 60 cc. of acetone are added 7.2 g. of Raney nickel catalyst. The mixture is hydrogenated at an initial pressure of 8 atmosphere and at 60° C. Then the mixture is filtered and concentrated and the oily residue is distilled to give 11.4 g. of crude 1-phenyl-4-isopropylamino-pyrazole, B.P. 120° C./0.1 mm. Hg. This product is dissolved in anhydrous ether and treated with alcoholic hydrochloric acid giving the hydrochloride which after crystallization from chloroform, melts at 188–190° C.

Example 10

By following the procedure described in Example 9 and treating 1-phenyl-4-amino-pyrazole with methyl-n-propyl ketone, cyclopentanone, cyclohexanone or cycloheptanone, the corresponding N-alkylamino derivatives are obtained. They are, respectively: 1-phenyl-4-(pentyl-2)amino-pyrazole, B.P. 135–138° C./0.2 mm. Hg, the hydrochloride of which melts at 152–154° C.; 1-phenyl-4-cyclopentyl-amino-pyrazole, B.P. 130–135° C./0.1 mm. Hg., the hydrochloride of which melts at 190–192° C.; 1-phenyl-4-cyclohexylamino-pyrazole, M.P. 65–67° C. (B.P. 153–156° C./0.1 mm. Hg), the hydrochloride of which melts at 259–261° C.; 1-phenyl-4-cycloheptylamino-pyrazole, M.P. 58–60° C. (B.P. 140–150° C./0.1 mm. Hg), the hydrochloride of which melts at 189–191° C.

Example 11

5.2 g. of 1-phenyl-4-methylamino-pyrazole, obtained as described in Example 7, are dissolved in 50 cc. of methyl alcohol and to the solution obtained are added 7 g. of anhydrous sodium carbonate and 5.15 g. of diethylsulphate. The mixture is maintained at boiling with stirring for 8 hours then concentrated under vacuum. The residue is taken up with water, treated with few drops of dilute sodium hydroxide solution and the mixture extracted with ether. The aqueous layer is alkalized with dilute sodium hydroxide and extracted with ether. By evaporation of the ether and distillation of the residue, 2.7 g. of crude 1-phenyl-4-(methyl-ethyl)amino-pyrazole are obtained, B.P. 118–122° C./0.1 mm. Hg; its pure hydrochloride melts at 164–168° C.

Example 12

A solution of 5.2 g. of 1-phenyl-4-isopropylamino-pyrazole, obtained as described in Example 2, in 50 cc. of methyl alcohol is treated with 6.1 g. of anhydrous sodium carbonate and 3.63 g. of dimethylsulphate and the mixture is heated at boiling with stirring for 8 hours. By following the procedure described in Example 8, crude 1-phenyl-4-(methylisopropyl)amino-pyrazole is obtained; B.P. 115–117° C./0.1 mm. Hg. The corresponding pure hydrochloride melts at 170–172° C.

Example 13

3.46 g. of 1-phenyl-4-methylamino-pyrazole are added to a solution of 1.9 g. of sodium metabisulphite in 3.35 cc. of water. To the mixture are added, drop by drop, at room temperature and under stirring, 1.55 g. of Formalin. The resulting mixture is heated at 40° C. for 1 hour, then it is diluted with ethyl alcohol, filtered and crystallized from ethyl alcohol to obtain sodium 1-phenyl-pyrazole-4-methylamino methanesulphonate monohydrate; M.P. 278–280° C. In the same manner, utilizing as starting material a monoalkylamino derivative, obtained as described in Examples 9 and 10, the corresponding methanesulphonate is prepared.

Example 14

7 g. of 1-(2′-tolyl)-4-amino-pyrazole in 100 cc. of methanol, 15.2 cc. of dimethylsulphate and 8.5 g. of sodium carbonate are heated under reflux for 8 hours. Following the procedure described in Example 2, 1-(2′-tolyl) - 4 - dimethylamino-pyrazole hydrochloride is obtained, M.P. 185–186° C. Following the same procedure, 1-(2′,6′-xylyl) - 4 - dimethylamino-pyrazole and 1-(2′,6′-xylyl) - 4 - dimethylamino-pyrazole hydrochloride, M.P. 201–203° C. are obtained.

Example 15

To a solution of 0.3 mole of 1-(4′-benzyloxy)-phenyl-4-aminopyrazole and 1.2 mole of dimethylsulphate in 500 cc. of methanol are added 0.66 mole of anhydrous sodium carbonate and the resulting mixture is heated under reflux for 7–8 hours. Following the procedure described in Example 2, 1′-(4′-benzyloxy)-phenyl-4-dimethylamino-pyrazole hydrochloride is obtained, M.P. 195–196° C.

A solution of 4.2 g. of this product in anhydrous methanol is treated with 0.5 g. of 10% platinum-on-charcoal catalyst and hydrogenated at room temperature and normal pressure. When the absorption of hydrogen ceases the reaction mixture is filtered, evaporated and the residue is dissolved in ethyl alcohol and acidified with hydrochloric acid to give 1-(4′-hydroxy)-phenyl-4-dimethylamino-pyrazole hydrochloride, M.P. 218–220° C.

Example 16

A solution of 8.15 g. of 1-(4′-acetylamino)-phenyl-4-aminopyrazole, 14.2 cc. of dimethylsulphate and 7.95 g. of sodium carbonate in 100 cc. of methanol is heated under reflux for 8 hours. The mixture is treated as described in Example 2 and gives 1-(4′-amino)-phenyl-4-dimethylamino-pyrazole dihydrochloride, M.P. 224–225° C.

Example 17

A solution of 2.3 g. of 1-(4'dimethylamino)-phenyl-4-aminopyrazole, 5.02 g. of dimethylsulphate and 4.66 g. of potassium carbonate in 25 cc. of methanol is heated under reflux for 7 hours. Following the procedure described in Example 2, 1-(4'-dimethylamino)-phenyl-4-dimethylamino-pyrazole dihydrochloride, M.P. 220–222° C. is obtained. The same product is obtained starting from 1-(4'-amino)-phenyl-4-amino-pyrazole, under the same conditions described above but employing a double quantity of dimethylsulphate.

Example 18

1-phenyl-4-dimethylamino-pyrazole is treated with an aqueous solution of formaldehyde. The reaction mixture is heated to reflux for 2 hours, then cooled. The resulting solid material is filtered off and the filtrate extracted many times with ether. The ethereal extract is washed with a sodium bisulphite solution and with water, dried on sodium sulphate and the ether removed on a steam bath. The crude residue is purified by crystallization from hexane to give 1 - phenyl - 4 - dimethylamino-5-hydroxymethyl-pyrazole.

What is claimed is:

1. A member selected from the group consisting of a compound of the formula:

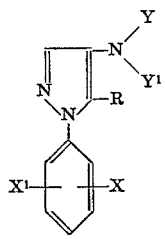

in which R is selected from the group consisting of hydrogen and hydroxymethyl, X is a member selected from the group consisting of hydrogen, lower alkyl, hydroxy, amino, lower alkylamino, lower dialkylamino, acetylamino and nitro, $X^1$ is selected from the group consisting of hydrogen and lower alkyl, Y is selected from the group consisting of lower alkyl and the group $CH_2SO_3M$ where M is an alkali metal, and $Y^1$ is selected from the group consisting of lower alkyl and cycloalkyl; and a pharmaceutically acceptable acid addition salt thereof.

2. A compound as claimed in claim 1 in which X and $X^1$ are hydrogen.
3. 1-phenyl-4-dimethylamino-pyrazole.
4. Sodium 1-phenyl-pyrazole-4-methylamino methanesulphonate.
5. 1 - phenyl-4-dimethylamino-5-hydroxymethylpyrazole.
6. 1-(2',6'-xylyl)-4-dimethylamino-pyrazole.
7. 1-phenyl-4-dimethylamino-pyrazole hydrochloride.
8. 1-(2',6'-xylyl) - 4 - dimethylamino-pyrazole hydrochloride.

References Cited

Alberti et al.: Chem. Abst., vol. 58, cols. 904–5 (1963).
Alberti et al.: Chem. Abst., vol. 61, cols. 13299–301 (1964).
Casoni: Gaz. Chem. et al., vol. 89, p. 1539–42 (1959).
Huebner et al.: Jour. Amer. Chem. Soc., vol. 72, 4812–3 (1950).
Leshchinyuk: Chem. Abst., vol. 57, col. 13139 (1962).
Mustante: Chem. Abst., vol. 38, cols. 4597–8 (1944).

HENRY R. JILES, *Primary Examiner.*

NATALIE TROUSOF, *Assistant Examiner.*